March 26, 1940.  E. K. CLARK  2,195,000

THERMOSTAT

Original Filed Oct. 27, 1938    2 Sheets-Sheet 1

WITNESSES:
E. A. McCloskey
H. G. Hepler

INVENTOR
Earl K. Clark.
BY
W. R. Coley
ATTORNEY

March 26, 1940.  E. K. CLARK  2,195,000
THERMOSTAT
Original Filed Oct. 27, 1938    2 Sheets-Sheet 2
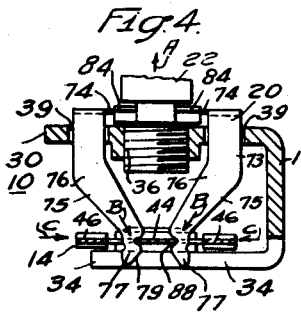
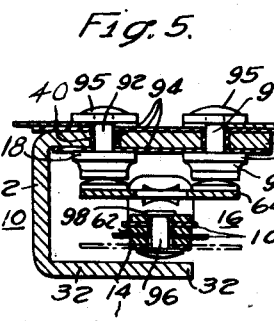
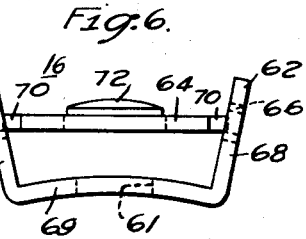
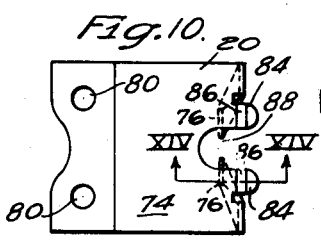
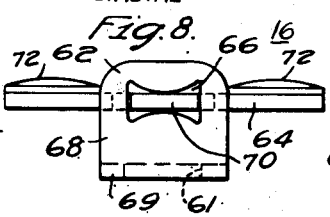
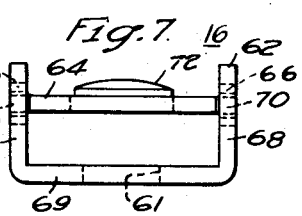
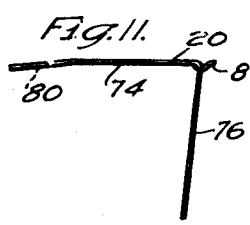
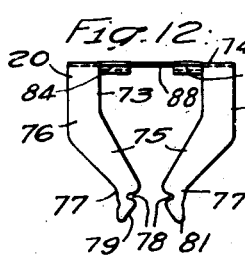
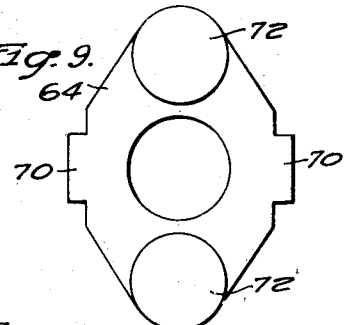
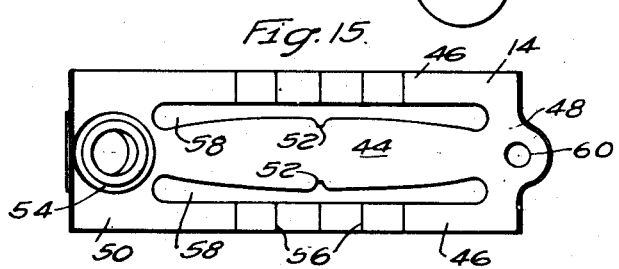
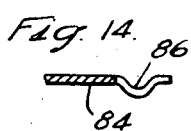
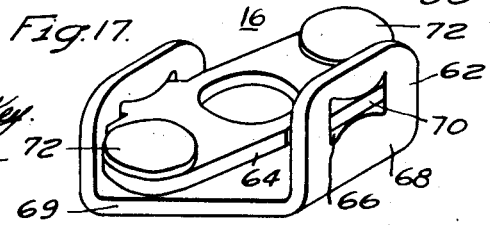
WITNESSES:
INVENTOR
Earl K. Clark.
BY
ATTORNEY

UNITED STATES PATENT OFFICE 2,195,000

THERMOSTAT

Earl K. Clark, Mansfield, Ohio, assignor to Westinghouse Electric & Manufacturing Company, East Pittsburgh, Pa., a corporation of Pennsylvania Application October 27, 1938, Serial No. 237,270
Renewed November 16, 1939

18 Claims. (Cl. 200—139)

My invention relates to thermostats, and more particularly to a method of controlling the operations of the bimetallic member of a snap-acting bimetallic thermostat.

An object of my invention is to provide a thermally sensitive flat-iron thermostat capable of operating on a very low differential of temperature so that such thermostat may be directly mounted upon the iron sole plate and respond to the temperature variations thereof.

Another object of my invention is to provide a bimetallic snap-acting thermostat having an adjusting device operatively associated with the bimetallic member thereof so as to substantially eliminate any relative movement between the adjusting device and the bimetallic member or the supporting base as the bimetallic member snaps from "off" to "on" and "on" to "off."

A further object of my invention is to provide a thermostat including a bimetallic member having a central strip and two exterior strips with a resilient adjusting member which has a snap-on, resilient, fulcruming engagement with the bimetallic member for retaining and adjustably varying the operation of such bimetallic member.

A still further object of my invention is to provide a thermostat including a bimetallic member with a movable contact assembly comprising a U-shaped bracket and a contact plate rockably fulcrumed to the bracket within hour-glass-shaped apertures positioned within the sides of the bracket.

Another object of my invention is to provide an efficient, inexpensive, rugged bimetallic thermostat capable of handling at least 1500 watts with a very narrow temperature differential throughout its complete operating range.

A further object of my invention is to provide a snap-acting flat-iron thermostat which may be rigidly attached to the sole plate thereof to provide direct thermal conduction therebetween.

Other objects of my invention will either be pointed out specifically in the course of the following description of a device embodying my invention, or will be apparent from such description.

In the accompanying drawings:

Figs. 4 and 5 are sectional views, respectively, taken along the lines IV—IV and V—V of Fig. 3;

Fig. 6 is a side view of the contact assembly before being fabricated;

Figs. 7 and 8 are side and end views of the bracket included in the contact assembly;

Fig. 9 is a plan view of the contact plate included in the contact assembly;

Figs. 10, 11 and 12 are top, side and end views of the intermediate adjusting member included in the thermostat embodying my invention;

Fig. 13 is a fragmentary enlarged view of a portion of the adjusting member shown in Fig. 12;

Fig. 14 is a view taken along the line XIV—XIV of Fig. 10;

Figs. 15 and 16 are top and side views, respectively, of the bimetallic member and mounting means therefor; and Fig. 17 is an enlarged perspective view of the movable contact assembly.

Figure 1:
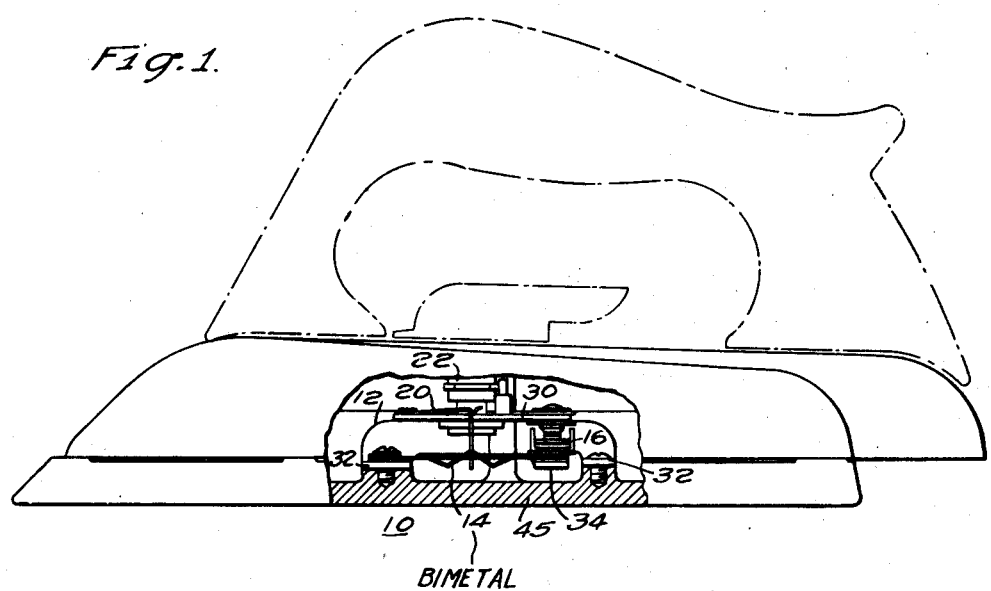
Figure 1 is an elevational and partial sectional view of an iron and thermostat embodying my invention.
Figure 2:
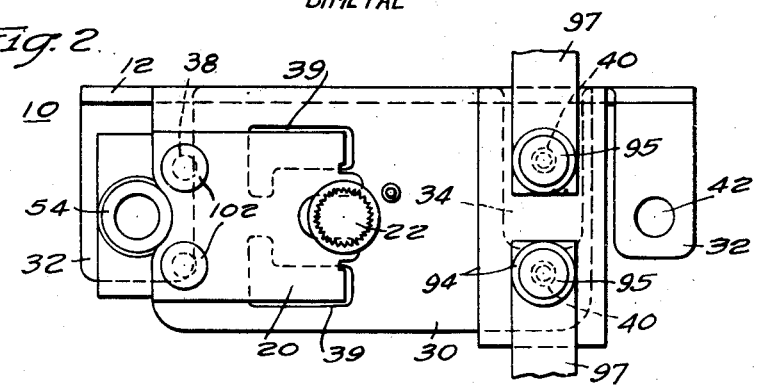
Figs. 2 and 3 are top and side elevational views, respectively, of the thermostat embodying my invention.

Referring to the accompanying drawings, I show a bimetallic thermostat 10 comprising an irregularly shaped supporting structure or base 12, a bimetallic thermal responsive member 14, a movable contact assembly 16 rigidly attached to and insulated from the free end of the bimetallic member, stationary contacts 18 rigidly attached to and insulated from the supporting base 12 and positioned so as to be operatively associated with a movable contact assembly 16, an intermediate adjusting member 20 having a snap-on and resilient fulcruming engagement with the bimetallic member 14, and an adjusting member 22 for adjusting the operation of the bimetallic member 14 and movable contact assembly 16.

The supporting structure or base 12 is, in this instance, formed from a single sheet of metal. However, it is to be understood that such structure may be formed from a plurality of elements or molded from a phenolic resinous material, or made in any other desired manner. The supporting structure 12 includes, in this instance, a horizontally positioned, forward or outwardly extending upper ledge or supporting shelf 30. Two lower forward or outwardly extending feet 32 are provided, which extend substantially parallel to the upper main supporting ledge 30, for rigidly attaching the structure 12 to the sole plate of an iron or any other suitable appliance, and a single forward or outwardly extending lug 34 cooperates with the bimetallic member 14 to limit its downward movement. The main supporting ledge 30 has a centrally disposed vertically extending threaded aperture 36 for receiving the adjusting means 22, a plurality of apertures 38 within one end thereof for rigidly attaching the adjusting member 20 thereto, a plurality of substantially L-shaped apertures 39 for permitting the depending fingers 76 of the adjusting member to pass therethrough, and a plurality of apertures 40 within the other end thereof for receiving the stationary contacts 18. The feet or supporting members 32 have centrally disposed apertures 42 located therein permitting direct connection with the sole plate of the iron to afford good thermal communication therebetween, as shown in Fig. 1. In addition, the left support member 32 has an upwardly extending counterbore 43 to readily receive the bimetallic-member-supporting rivet 54.

The bimetallic thermal responsive member 14 (see also Fig. 15) comprises, in this instance, a unitary bimetallic element having a central strip 44, two exterior strips 46, and two end portions 48 and 50, all formed by means of laterally positioned elongated slots 58. It is to be understood that, if desired, the bimetallic member 14 may be constructed from a plurality of members so as to form a functionally integral structure, substantially as described. The central strip 44 has transversely extending notches 52 located substantially at the midpoint thereof to cooperate with the adjusting member 20, substantially as hereinafter described. The end portion 50 has a rivet structure 54 rigidly attached thereto which permits the bimetallic member 14 to be rigidly attached to the supporting structure 12 without altering the preset thermal characteristics of such member, in a manner set forth in the E. K. Clark and P. R. Lee copending application Serial No. 225,354, filed August 17, 1938, and assigned to Westinghouse Electric & Manufacturing Company. The bimetallic member 14 will thus be in direct thermal communication with the sole plate 45 of a flat iron, or the like, as shown in Fig. 1. The exterior strips 46 of the preferred bimetallic member 14 may have a plurality of waves 56 formed therein. These waves or deformations are formed to ensure a snap-acting toggling action of the bimetallic member. An aperture 60 is positioned within the end portion 48 of the bimetallic member 14 to permit the contact assembly 16 to be rigidly attached thereto, substantially as hereinafter described.

The movable contact assembly 16, as shown in Figs. 6, 7, 8 and 17, includes, in this instance, a supporting bracket 62 and a contact plate 64 flexibly attached thereto. The supporting bracket 62 is substantially U-shaped with upwardly extending side portions 68 and a base 69, as shown in Fig. 6. The upwardly extending sides 68 are originally bowed slightly outwardly to permit the contact plate 64 to be readily assembled therewith, as hereinafter described. Hour-glass-shaped apertures 66 are positioned within the upwardly extending side portions 68 of the U-shaped brackets 62 to cooperate with the contact plate 64.

The contact plate 64, as shown in Figs. 8 and 9, is relatively thin with respect to its width and length. The thickness of the plate 64 is substantially equal to the shortest transverse or vertical distance across the hour-glass-shaped aperture to prevent any relative vertical movement thereof, as hereinafter described. Outwardly-extending transversely-disposed tongues 70 of substantially the same length as the apertures 66 are positioned on either side at substantially the midpoint thereof. The tongues 70 are adapted to be positioned within the hour-glass-shaped aperture 62 so as to flexibly or fulcrumly cooperate with the upwardly extending sides 68 of the U-shaped brackets 62. When uniting the contact plate 64 with the U-shaped bracket 62, such contact plate 64 (Fig. 9) is positioned upon such bracket within the outwardly diverging sides 68, as shown in Fig. 6. The tongues 70 are then positioned in line with the hour-glass-shaped apertures 66. The side walls 68 of the bracket 62 are then pressed into an upright position substantially normal to the base 69, as shown in Fig. 7, with the tongues 70 extending through the apertures 66.

The contact plate 64 will then be, rockably, fulcrumly or flexibly attached to the bracket 62 and will be permitted to rock or swing about a transverse axis extending through the midpoint of the tongues 70 or apertures 66. However, due to the plate 64 and tongues 70 having a thickness substantially equal to the shortest vertical distance across the hour-glass-shaped apertures, there can be substantially no vertical movement of the plate 64 with respect to the bracket 62, regardless of the angular position of the plate 64. It is preferred that suitable contacts 72 be rigidly attached to substantially the ends of the contact plates 64 to cooperate with the stationary contacts 18.

The movable contact assembly 16 is rigidly attached to the free or movable end portion 48 of the bimetallic member 14 by having a suitable rivet 96 (see Figs. 3 and 5) positioned through the apertures 60 of the bimetallic member 14 and the aperture 61 in the U-shaped bracket 62, whereupon the upper end of the rivet 96 is spun over against the U-shaped bracket 62 substantially as shown at 98 in Fig. 5. The U-shaped bracket 62 is thus rigidly attached to the free end of the bimetallic member 14 and will move with such bimetallic member. The U-shaped bracket and movable contact assembly 16 is, preferably, insulated from the bimetallic member 14 by using suitable insulating washers and sleeves 100 (see Fig. 5).

The stationary contacts 18 being two, in this instance, comprise a main contact portion 90 and an upwardly extending rivet portion 92. The contacts 18 are rigidly attached to the outwardly extending supporting ledge 30 of base 12 by having the upwardly extending rivet portion 92 inserted through the apertures 40 located within the ledge 30, whereupon the upper end of said rivets are, for example, spun over tightly against the upper surface of the ledge 30, as shown at 95, Fig. 5. Suitable insulating washers and sleeves 94 may be positioned between the main body portion 90 and rivet portion 92 of the contacts 18 to properly insulate them from the supporting structure 12. Suitable terminal straps 97 may be associated with the stationary contacts to afford means for connecting the thermostat to the circuit (not shown) which it is desired to have such thermostat control.

The intermediate adjusting member 20, shown in Figs. 10 to 14, inclusive, comprises, in this instance, a main body portion 74 and downwardly converging fingers or prongs 76 near one end thereof. The adjusting member 20 is preferably formed of a resilient material to permit the fingers 76 and the body portion 74 to be moved to a limited extent substantially along the longitudinal axis of the fingers 76 and to permit the lower end of the fingers 76 to produce a biasing action substantially along their transverse axis, for a purpose hereinafter described.

The main body portion 74 of the intermediate adjusting member 20 has a plurality of apertures 75

80 positioned at one side to permit the adjusting member 20 to be rigidly attached to the supporting structure 12, with the fingers 76 depending from both edges of the other side of the main portion 74. A semi-circular notch 88 is positioned within the portion 74 intermediate the depending fingers 76 to permit the adjusting member 20 to be positioned about the adjusting screw 22 and to permit the fingers 76 to be positioned one on either side of such adjusting screw. Lips 84 extend outwardly from the main portion 74 of the adjusting member 20 one on either side of the notch 88, and intermediate such notch 88 and the respective depending fingers 76. The lips 84 have a downwardly extending semi-cylindrical groove 86 therein to cooperate with the adjusting screw 22, as hereinafter described.

The depending fingers 76 of the adjusting member 20, as shown in Figs. 11 and 12, are relatively narrow, and have an upper section 73 which extends substantially normal to the main portion 74, an intermediate inwardly tapering section 75, and a lower tip or gripping section 81. Each gripping section 81 has a notch 78 in the upper portion of its inner edge, to engage the central strip 44 of the bi-metallic member 14, as shown in Fig. 4 and as hereinafter more fully described. The inner edge 79 of the lower portion of each gripping section 81 tapers outwardly from the notches 78 to permit a snap-on connection between the fingers 76 and the bimetallic member 14 (see Fig. 13). The notches 78 are of such shape to permit free cooperation with the notches 52 and central strip 44 of bimetallic member 14, as will be hereinafter more fully described.

The adjusting screw or means 22 is, in this instance, a shaft threadedly engaged with the upper main supporting ledge 30 of support 12 through cooperation with the threaded aperture 36, and is adapted to extend outside the iron to permit an operator to readily adjust the thermostat 10 through the cooperation of the adjusting member 20, as hereinafter described.

Figure 3:
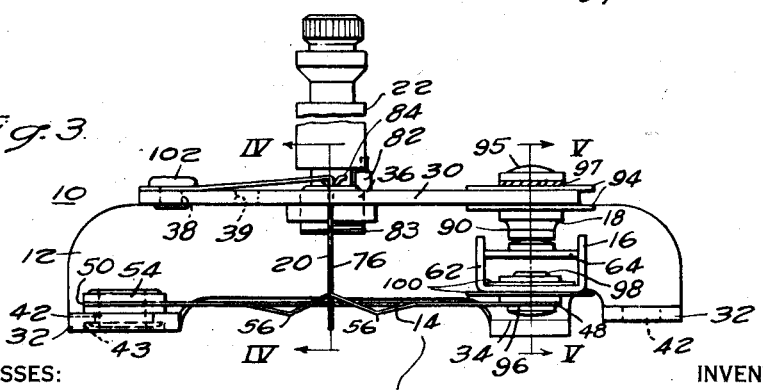

The adjusting screw 22, as shown in Fig. 3, has a threaded portion 83 located at substantially the lower end thereof and adapted to cooperate with the threaded aperture 36 in support 12. An annular notch 82 is positioned within the lower portion of the screw 22 a short distance above the threaded portion 83. The notch 82 cooperates with the lips 84 of the adjusting member 20, so that as the adjusting screw 22 is rotated within aperture 36, the cooperation thereof with adjusting member 20 will adjust the operation of the bimetallic member 14, as will be hereinafter more fully described.

When assembling the thermostat 10, the stationary contacts 18 are rigidly and insulatedly attached to the supporting ledge 30 as hereinabove described. The movable contact assembly 16 is rigidly attached to the bimetallic member 14 so as to be in cooperative alignment with the stationary contacts 18. The bimetallic member 14 is then rigidly attached to one of the supporting feet 32 by having the attaching rivet 54 positioned within the aperture 42 therein and rigidly attached thereto by having the lower end of such rivet spun over tightly against the supporting foot 32, within the counterbore 43, in accordance with the teachings of Clark and Lee as set forth in their above-identified copending application. The bimetallic member 14 is thus positioned substantially along the longitudinal axis of the thermostat 10 with the movable contact assembly 16 located substantially vertically above the lug or ledge 34, which, as the thermostat 10 is opened or disengaged, limits the downward movement of the bimetallic member.

The adjusting screw 22 is then inserted within the threaded aperture 36 and located so that the annular notch 82 will be substantially in line with the top surface of the supporting ledge 30. The adjusting member 22 is then positioned upon the supporting ledge 30 with the lips 84 extending into and cooperating with the notch 82 as the fingers 76 are positioned through the L-shaped apertures 39. See Fig. 3. The apertures 80 will then substantially fall in line with the apertures 38 located in the ledge 30 whereupon suitable rivets 102 may be positioned therethrough to rigidly attach one end of the adjusting member 20 to the supporting structure 12. As the adjusting member is positioned upon the supporting structure 12 with the downwardly extending fingers 76 projecting through apertures 39, such fingers are positioned substantially in line with, and one on either side of, the adjusting screw 22.

As the intermediate adjusting member 20 is positioned upon the supporting structure 12 with the downwardly extending fingers 76 extending through the supporting ledge 30, the gripping sections 81 of such fingers 76 will engage the central strip 44 of bimetallic member 14. Inasmuch as such fingers 76 are formed of a resilient material, the tapered edges 79 thereof will cause the fingers 76 to be spread apart as they are forced down upon the bimetallic member, so that such fingers will slide over and within the notches 52 in the central strip 44 of the bimetallic member 14.

As the fingers 76 are slid down along the central strip 44 within the notches 52 therein, the notches 78, within the fingers 76, will cooperate with the notches 52 in central strip 44 of bimetallic member 14, and establish a snap-on or resilient connection therewith. The notches 52 in the central strip 44 will prevent any relative movement between the fingers 76 of the adjusting member 20 and bimetallic member 14 along the longitudinal axis of the bimetallic member 14. The notches 78 will prevent any relative movement between the fingers 76 and bimetallic member 14 along the longitudinal axis of the fingers 76 or normal to the plane of the bimetallic members 14. Accordingly, it is obvious that there will be no relative movement between the adjusting member 20 and bimetallic member 14.

However, it is apparent that inasmuch as the fingers 76 of adjusting member 20 resiliently engage the bimetallic member 14 through the cooperation of notches 78 and 52, the bimetallic member will be free to flex from one position to another about such engagement as a fulcrum. However, such flexing action will occur without any relative linear movement between such adjusting member and bimetallic member at the fulcrum.

As the intermediate adjusting member 20 is positioned upon the supporting structure 12, the lips 84 cooperate with the adjusting screw 22 by extending into the annular notch 82 therein. These lips 84, after the adjusting member 20 is rigidly attached to the support 12, are biased downwardly against the screw 22 at all times, regardless of the position of such screw. This cooperative action between the lips 84 and adjusting screw 22 then enables the longitudinal or vertical movements of the adjusting screw 22 to be accurately transmitted to the central strip 44 of the bimetallic member 14, through the cooperation of the fingers 76 at all times without any lost motion.

It, therefore, follows that, as the screw 22 is moved upwardly, the force applied to the adjusting member will also be in an upward direction along the adjusting screw 22 as shown by the arrow A in Fig. 4. This force will be applied to the bimetallic member 14 through the fingers 76, and due to their inwardly tapered configuration will be applied in the direction of such fingers and arrow B, in Fig. 4. Accordingly, the lower end or gripping section 77 of the fingers 76 will be biased inwardly substantially as shown by arrows C in Fig. 4. This condition ensures a positive, resilient, gripping, snap-on connection between the adjusting member 20 and the bimetallic member 14 at all times, as well as permitting the bimetallic member 14 to freely flex thereabouts at all times.

As the bimetallic member 14 flexes from an "off" to an "on" or from an "on" to an "off" position, there is a momentary period at which there will be substantially no direct force between the bimetallic member 14 and its supporting structure, namely, the adjusting screw 22 and the fingers 76. However, due to the downward biasing action of the resilient adjusting member 20, whereby the lips 84 are biased against the lower surface of the annular notch 82 and due to the transverse resilient action between the fingers 76 and the central strip 44, it is apparent that there will be no loose or free movement between any of the cooperating parts or the bimetallic member 14, adjusting member 20 and adjusting screw 22. This feature permits the thermostat 10 to be accurately or exactly adjusted to a very close temperature differential at all times.

The movable contact assembly 16, being rigidly attached to the free end of the bimetallic member 14, moves therewith. However, inasmuch as the contact plate 64 is flexibly or rockably fulcrumed within the hour-glass-shaped apertures located in the side walls of bracket 62, it follows that the movable contacts 72 positioned upon the plates 64 will have a relatively loose free movement with respect to the stationary contacts 18. This ensures a positive engagement of equal pressure between both stationary contacts and the movable contacts at all times.

The downward movement of the movable contact assembly 16 and free end of the bimetallic member 14 is limited by the lug 34, and may be varied by adjusting the relative position thereof. This adjustment controls the thermal amplitude or sensitivity of the completed thermostat.

It is, therefore, obvious that the device embodying my invention provides a thermally sensitive flat-iron thermostat capable of handling at least 1500 watts with a very narrow temperature differential having an adjusting means operatively associated with the bimetallic snap-acting member so as to substantially eliminate any relative movement therebetween, and a movable contact assembly including a contact plate which is free to rock or flex with respect to the bimetallic member, but is prevented from substantially any bodily vertical movement with respect thereto.

Various modifications may be made in the device embodying my invention without departing from the spirit and scope thereof, and I desire, therefore, that only such limitations shall be placed thereon as are imposed by the prior art and the appended claims.

I claim as my invention:

1. A thermostat comprising, in combination, a bimetallic thermal responsive member and an adjusting member having resilient portions for yieldingly engaging such bimetallic member at all times.

2. A thermostat comprising, in combination, a bimetallic thermal responsive member having a central strip and two exterior strips and an adjusting member having a resiliently gripping connection with the central strip of such bimetallic member.

3. A thermostat comprising, in combination, a supporting structure, a bimetallic thermal responsive member rigidly attached to the structure, and an adjusting member attached to the base having means for resiliently engaging the bimetallic member.

4. A thermostat comprising, in combination, a supporting structure, a bimetallic thermal responsive member having a central strip and two exterior strips rigidly attached to the structure and in direct thermal communication with the supporting structure, and an adjusting member rigidly attached to the structure having an operative connection with the central strip of such bimetallic member.

5. A thermostat comprising, in combination, a strip-type bimetallic thermal responsive member, and an adjusting member having a fulcruming connection with both edges of such bimetallic member.

6. A thermostat comprising, in combination, a supporting structure, a bimetallic thermal responsive member having a central strip and two exterior strips rigidly attached to the structure and in direct thermal communication with the supporting structure, and a pronged adjusting member attached to the structure having a resilient and fulcruming connection with the central strip of the bimetallic member.

7. A thermostat comprising, in combination, a supporting structure, a bimetallic member, an intermediate member resiliently engaging the bimetallic member, and an adjusting means operatively associated with the intermediate member for adjustably moving such member and varying the operation of the bimetallic member.

8. A thermostat comprising, in combination, a supporting structure, a bimetallic member, an intermediate member attached to the structure at one end and resiliently engaging the bimetallic member at the other end, and an adjusting means operatively associated with the intermediate member intermediate the ends thereof for adjustably moving such member and varying the operation of the bimetallic member.

9. A thermostat comprising, in combination, a supporting structure, a bimetallic thermal responsive member having a central strip and two exterior strips rigidly attached to the structure and in direct thermal communication with the supporting structure, an intermediate member attached to the structure at one end and resiliently engaging the central strip of the bimetallic member at the other end, and an adjusting screw operatively associated with the intermediate member intermediate the ends thereof for adjustably moving such member and varying the operation of the bimetallic member.

10. A thermostat comprising, in combination, a bimetallic thermal responsive member, having a central strip and two exterior strips, an adjusting member having means for resiliently engaging the central strip of the bimetallic member, and a flexibly mounted movable contact rigidly attached to the bimetallic member.

11. A thermostat comprising, in combination, a supporting structure, a bimetallic thermal responsive member having a central strip and two exterior strips rigidly attached to the structure and in direct thermal communication with the supporting structure, a movable contact assembly attached to the bimetallic member having a flexibly mounted contact plate, an intermediate member resiliently engaging the bimetallic member, and an adjusting means operatively associated with the intermediate member for adjustably moving such member and varying the operation of the bimetallic member and movable contact assembly.

12. A thermostat comprising, in combination, a bimetallic member, and an adjusting member having a main portion and two depending fingers which engage the bimetallic member.

13. A thermostat comprising, in combination, a bimetallic member, and a resilient adjusting member having a main portion and two depending fingers which resiliently engage the bimetallic member.

14. A thermostat comprising, in combination, a bimetallic member, and an adjusting member including a main portion and two depending fingers having a notched inner surface constituting a transverse snap-on connection with the bimetallic member.

15. A thermostat comprising, in combination, a supporting structure, a bimetallic thermal responsive member having a central strip and two exterior strips rigidly attached to the structure, an adjusting member including a main portion rigidly attached to the structure and two depending fingers having a resilient transverse engagement with the central strip of the bimetallic member.

16. A thermostat comprising, in combination, a supporting structure, a functionally integral bimetallic member having a central strip and two exterior strips rigidly attached to the structure in direct thermal communication with such structure, a movable contact assembly attached to the bimetallic member comprising a U-shaped bracket having hour-glass-shaped apertures positioned within the sides thereof and rigidly attached to the member and a contact plate fulcrumed to the bracket within said apertures, a resilient intermediate member, comprising a main portion and two depending fingers, attached to the supporting structure at one end by the main portion and having a resilient transverse engagement with the central strip of the bimetallic member at the other end, and an adjusting member threadedly engaged with the supporting structure and operatively associated with the main portion of the intermediate member for adjustably moving such member and for varying the operation of the bimetallic member and movable contact assembly.

17. In a thermostat including a bimetallic member having a plurality of strips, a resilient member engaging one of the strips for limiting the movement thereof, and adjusting means operatively associated with the resilient member for adjusting the operations of the member and bimetallic member.

18. A thermostat comprising, in combination, a bimetallic thermal responsive member, a temperature biasing member operatively associated with the bimetallic member for retaining a portion of the bimetallic member in a relatively fixed position, and an adjusting device operatively associated with the biasing member for adjusting the relative positions of the biasing member and the fixed position of the bimetallic member for regulating the operations of the bimetallic member.

EARL K. CLARK.